(12) United States Patent
Kameoka et al.

(10) Patent No.: US 7,874,537 B2
(45) Date of Patent: Jan. 25, 2011

(54) SWIVEL DEVICE AND VIDEO DISPLAY APPARATUS EQUIPPED WITH SWIVEL DEVICE

(75) Inventors: Shinichi Kameoka, Osaka (JP); Akihiro Fujikawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 625 days.

(21) Appl. No.: 11/785,669

(22) Filed: Apr. 19, 2007

(65) Prior Publication Data

US 2008/0035821 A1 Feb. 14, 2008

(30) Foreign Application Priority Data

Apr. 27, 2006 (JP) ............... 2006-123520

(51) Int. Cl.
*A47B 91/00* (2006.01)
*A47B 95/00* (2006.01)

(52) U.S. Cl. ............ 248/349.1; 248/917; 248/918; 248/919; 248/920; 248/921; 248/922; 248/923; 248/458; 248/131; 361/679.02; 361/679.06; 361/679.21

(58) Field of Classification Search ......... 248/229.12, 248/229.14, 229.22, 229.24, 228.5, 230.5, 248/231.61, 600, 607, 917–923, 458, 131, 248/349.1; 361/679.06, 679.21, 679.22
See application file for complete search history.

(56) References Cited

U.S. PATENT DOCUMENTS

| | | | | |
|---|---|---|---|---|
| 5,243,434 A * | 9/1993 | Nodama | ............ | 348/827 |
| 5,749,304 A | 5/1998 | Turner | ............ | 108/20 |
| 5,749,556 A * | 5/1998 | Matsuoka et al. | ............ | 248/349.1 |
| 6,161,806 A * | 12/2000 | Crosson | ............ | 248/118.3 |
| 6,189,842 B1 * | 2/2001 | Bergeron Gull et al. | .. | 248/125.1 |
| 6,334,599 B1 | 1/2002 | Jeong | ............ | 248/371 |
| 6,801,426 B2 * | 10/2004 | Ichimura | ............ | 361/679.06 |
| 7,384,021 B2 * | 6/2008 | Liao | ............ | 248/415 |
| 7,475,452 B2 * | 1/2009 | Yeh | ............ | 16/367 |
| 2005/0194509 A1 * | 9/2005 | Tsai et al. | ............ | 248/349.1 |
| 2006/0284034 A1 * | 12/2006 | Takaji et al. | ............ | 248/131 |
| 2007/0194184 A1 * | 8/2007 | Jang | ............ | 248/131 |
| 2008/0099652 A1 * | 5/2008 | Sawai et al. | ............ | 248/419 |
| 2008/0100997 A1 * | 5/2008 | Chen | ............ | 361/681 |
| 2008/0192419 A1 * | 8/2008 | Sawai | ............ | 361/681 |

(Continued)

FOREIGN PATENT DOCUMENTS

DE 44 47 366 A1 12/1994

(Continued)

*Primary Examiner*—Anita M King
*Assistant Examiner*—Nkeisha J Smith
(74) *Attorney, Agent, or Firm*—Morgan Lewis & Bockius LLP (57) ABSTRACT

A swivel device includes a motor as a driving source, gears for transmitting a driving force of the motor, a ring member to which the driving force of the motor is transmitted, and a disk member made of a metal sheet to which the driving force of the motor is transmitted via the ring member. This disk member is integrally provided with eight boss portions that are arranged with equal spaces in the swivel direction. The ring member is integrally provided with a groove portion in a circular pattern into which the boss portions are inserted. In addition, the boss portions of the disk member are inserted in the groove portion of the ring member in a slidable manner.

2 Claims, 6 Drawing Sheets

U.S. PATENT DOCUMENTS

2008/0272262 A1\* 11/2008 Katsumata et al. ....... 248/349.1
2009/0045311 A1\* 2/2009 Seyedin ................... 248/349.1

FOREIGN PATENT DOCUMENTS

| | | |
|---|---|---|
| GB | 27252 | 4/1914 |
| JP | 57-178765 | 11/1982 |
| JP | 62-143371 | 9/1987 |
| JP | A-6-292106 | 10/1994 |

\* cited by examiner

FRONT SIDE

FIG. 11

FRONT SIDE

_US 7,874,537 B2_

SWIVEL DEVICE AND VIDEO DISPLAY APPARATUS EQUIPPED WITH SWIVEL DEVICE

This application is based on Japanese Patent Application No. 2006-123520 filed on Apr. 27, 2006, the contents of which are hereby incorporated by reference.

BACKGROUND OF THE INVENTION

1. Field of the Invention

The present invention relates to a swivel device and a video display apparatus equipped with the swivel device.

2. Description of Related Art

There is known a swivel device that supports a video display portion of a liquid crystal TV set or the like and turns around the vertical axis so that the direction of the video display portion can be changed as shown in JP-A-6-292106, for example.

JP-A-6-292106 discloses a turn table (a swivel device) equipped with a swivel gear disposed on a base in a pivotable manner around the vertical axis, a swivel frame disposed on the swivel gear in a pivotable manner around the vertical axis, and a motor that drives the swivel gear via a reduction gear mechanism. In this turn table, the swivel frame can be swiveled by a drive force of the motor as well as by a manual operation. The top surface of the swivel gear of the turn table is provided with protrusions, and the peripheral portion of the base is provided with leaf springs on a plurality of positions spaced from each other in the circumferential direction. These leaf springs press the protrusions of the swivel gear to the undersurface of the swivel frame, so that friction resistance is generated between the protrusions of the swivel gear and the undersurface of the swivel frame when the swivel gear turns. Thus, the driving force of the motor is transmitted to the swivel frame via the swivel gear, so that the swivel frame turns around the vertical axis. In addition, when the swivel frame is turned by a manual operation, the protrusions of the swivel gear slide with respect to the undersurface of the swivel frame if a force larger than the friction resistance is exerted in the swivel direction. Therefore, even if the swivel gear generates a swivel resistance due to the reduction gear mechanism, the swivel frame can be turned. In this way, the above-mentioned turn table described in JP-A-6-292106 can change the direction of the video display portion by the driving force of the motor because the swivel frame of the turn table supports the video display portion. In addition, the direction of the video display portion can be changed by a manual operation, too.

However, in the conventional turn table (swivel device) described in JP-A-6-292106, it is necessary to provide the leaf springs at a plurality of positions spaced from each other in the circumferential direction of the base so as to press the protrusions of the swivel gear to the undersurface of the swivel frame. Therefore, there is a problem in that the complicated structure thereof and increases in the number of components and man-hour to produce it cause an increase in the cost.

SUMMARY OF THE INVENTION

In view of the problem described above, the present invention has been made. An object of the present invention is to provide a swivel device that can be turned also by a manual operation and has a simple structure in which the number of components is reduced, and a video display apparatus equipped with the swivel device.

A swivel device of the present invention includes a turning mechanism portion that includes a driving source and transmits a driving force; a first turning member that engages with the turning mechanism portion and is capable of being turned by the driving force; a second turning member to which the driving force is transmitted via the first turning member; a protrusion portion that is provided integrally with one of the first turning member and the second turning member; and a groove portion that is provided integrally with other of the first turning member and the second turning member and into which the protrusion portion is inserted in a manner slidable in a swivel direction According to the swivel device of the present invention, the protrusion portion is inserted into the groove portion in a manner slidable in the swivel direction. Therefore, the first turning member and the second turning member can be turned by the driving source when it is driven. On the other hand, when a force larger than a predetermined force is exerted on the protrusion portion in the swivel direction, the protrusion portion slips in the swivel direction. Therefore, the first or the second turning member to which the protrusion portion is provided can be turned manually. In addition, since the protrusion portion is integrally provided with one of the turning members and the groove portion is integrally provided with the other turning member, an increase in the number of components can be suppressed so that an inexpensive swivel device having a simple structure can be provided.

DETAILED DESCRIPTION OF PREFERRED EMBODIMENTS

Hereinafter, embodiments of the present invention will be described with reference to the attached drawings.

Figure 1:
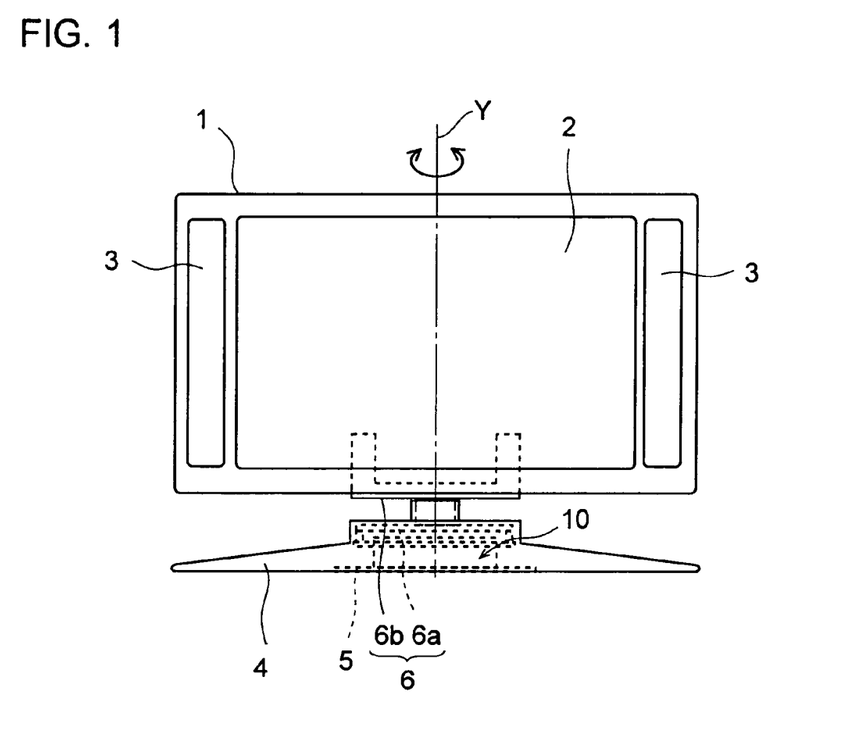
FIG. 1 is a front elevation showing a video display apparatus equipped with a swivel device according to an embodiment of the present invention.
Figure 2:
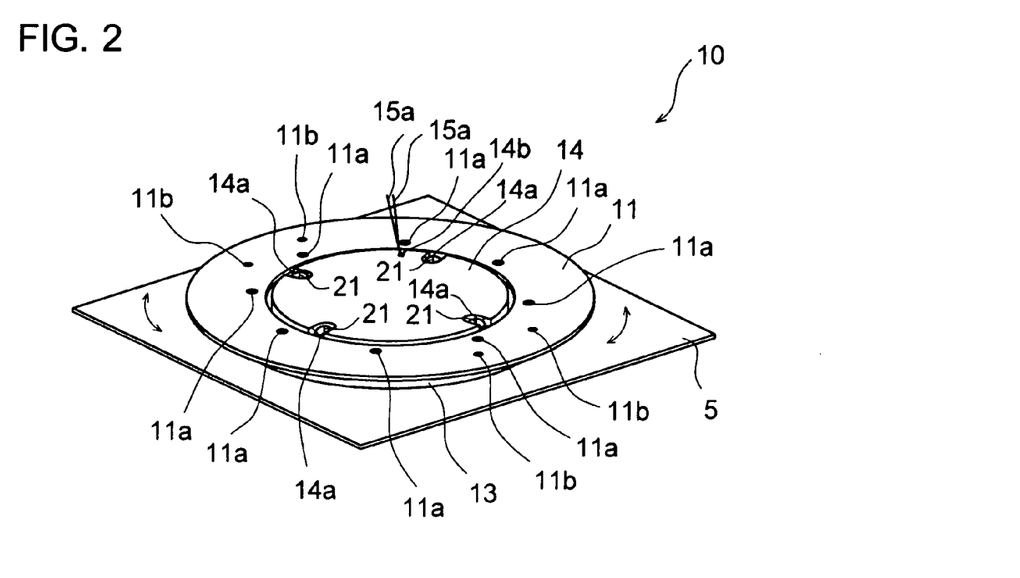
FIG. 2 is a general perspective view of the swivel device according to the embodiment of the present invention shown in FIG. 1.
Figure 3:
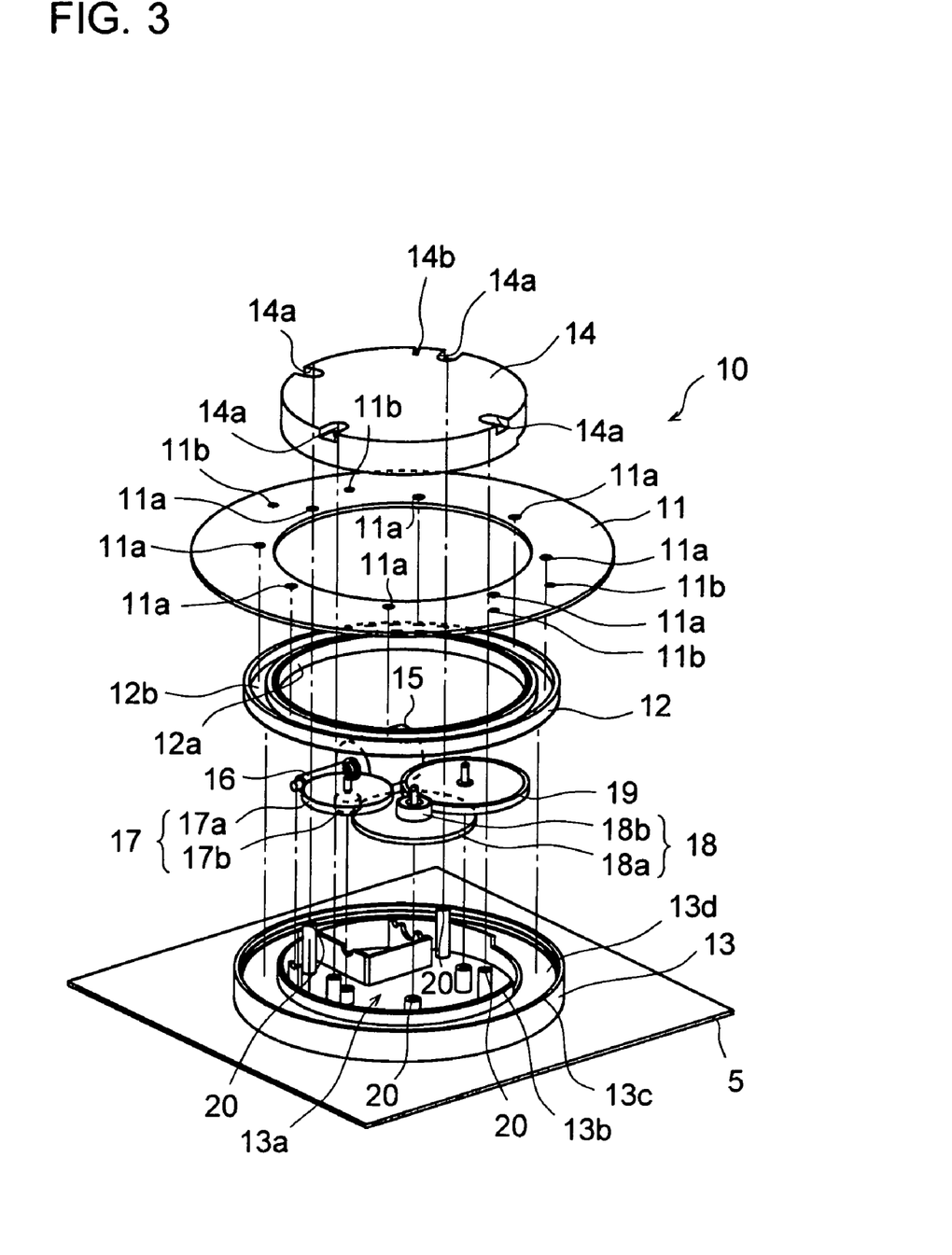
FIG. 3 is an exploded perspective view of the swivel device according to the embodiment of the present invention shown in FIG. 1.

FIG. 1 is a front elevation showing a video display apparatus equipped with a swivel device according to an embodiment of the present invention. FIG. 2 is a general perspective view of the swivel device according to the embodiment of the present invention shown in FIG. 1. FIG. 3 is an exploded perspective view of the swivel device according to the embodiment of the present invention shown in FIG. 1. FIGS. 4 to 9 are diagrams for explaining the swivel device according to an embodiment shown in FIG. 1. First, with reference to FIGS. 1-9, a structure of the swivel device and the video display apparatus equipped with the swivel device according to the present embodiment will be described.

The video display apparatus according to the present embodiment includes, as shown in FIG. 1, a video display apparatus main body portion 1, a swivel device 10 for turning the video display apparatus main body portion 1 around the vertical axis (Y axis), a cover member 4 that covers the swivel device 10, a base member 5 that fixes the swivel device 10, and a connection member 6 that connects the video display apparatus main body portion 1 to the swivel device 10. Furthermore, the video display apparatus main body portion 1 is a liquid crystal television set having a reduced thickness, which includes a video display portion 2 and speaker portions 3.

Figure 4:
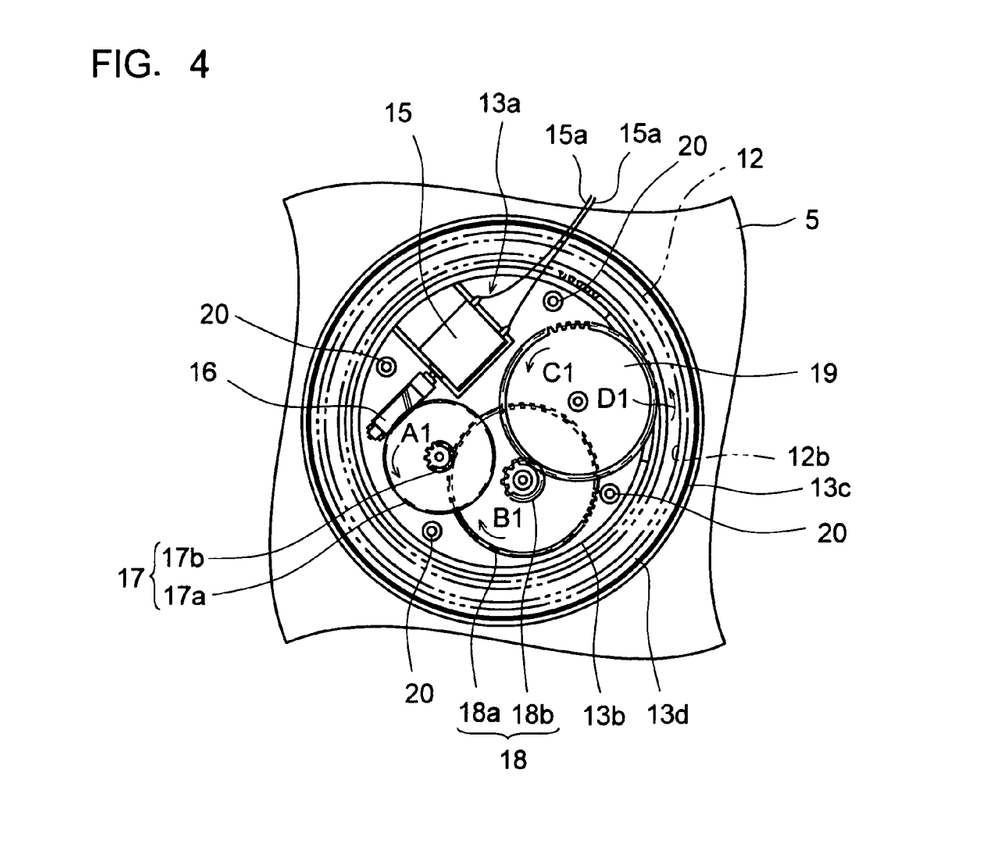
FIG. 4 is a plan view for explaining an internal structure of the swivel device according to the embodiment of the present invention shown in FIG. 1.

The swivel device 10 includes, as shown in FIGS. 2-4, a disk member 11 to which the connection member 6 (see FIG. 1) is attached, a ring member 12 made of a resin, a housing member 13 that houses a motor 15 (see FIG. 3) that will be described later and the like, and a lid body 14 that is attached to the housing member 13.

As shown in FIGS. 2, 3, 6 and 7, the disk member 11 is made of a metal plate that is shaped in a disk, and the disk member 11 is provided with eight cylindrical boss portions 11a symmetrically in a concentric manner in predetermined regions. More specifically, the boss portions 11a are disposed with equal spaces in the swivel direction. As shown in FIG. 8, the boss portion 11a is formed in the disk member 11 integrally by a press work (extruding) so as to protrude from the surface of the disk member 11 by the height t (approximately, 2-3 mm). In addition, the disk member 11 is provided with threaded holes 11b in which screws (not shown) are inserted for fastening the connection member 6.

Figure 5:
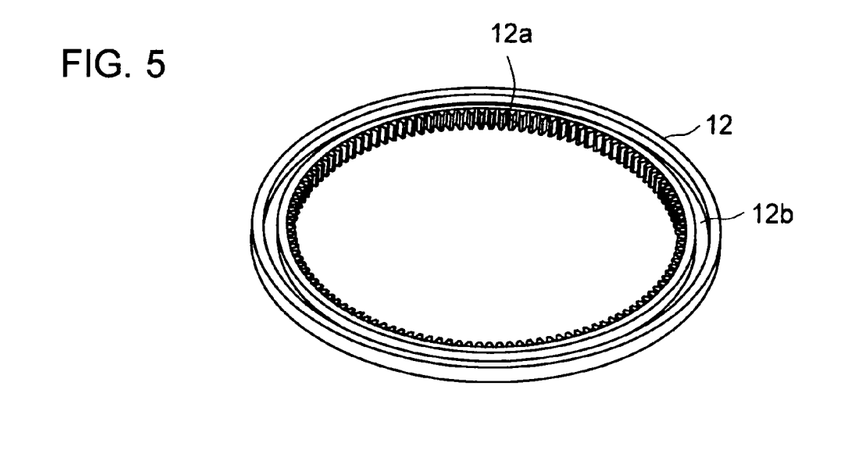
FIG. 5 is a perspective view of a ring member of the swivel device according to the embodiment of the present invention shown in FIG. 1.
Figure 6:
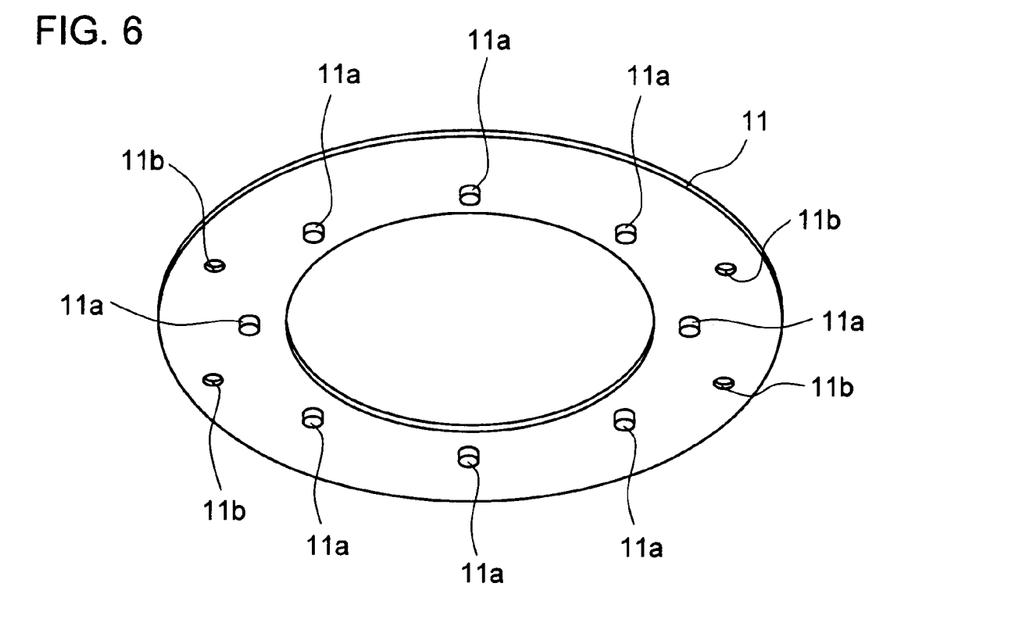
FIG. 6 is a perspective view of a disk member of the swivel device according to the embodiment of the present invention shown in FIG. 1.

As shown in FIGS. 3 and 5, the ring member 12 is provided with a gear 12a (see FIG. 5) formed on the inner edge and a groove portion 12b formed in a circular pattern along the circle of the ring member 12. The groove portion 12b is formed integrally with the ring member 12 that is molded of a resin. The groove portion 12b of the ring member 12 is designed so that the boss portions 11a of the disk member 11 can be inserted in the groove portion 12b.

Here, in the present embodiment, the boss portion 11a of the disk member 11 is formed to have a diameter D that is slightly larger than a width W of the groove portion 12b of the ring member 12 as shown in FIG. 8. Thus, when the boss portions 11a of the disk member 11 are inserted in the groove portion 12b of the ring member 12, the boss portions 11a are pressed to fit in the groove portion 12b so that there is a predetermined friction resistance caused between the boss portions 11a and the groove portion 12b. With this arrangement, when the ring member 12 is turned by the driving force of the motor 15, the disk member 11 is also turned along with turning of the ring member 12. In addition, when a force larger than a predetermined force is exerted in the swivel direction, the boss portions 11a slip with respect to the groove portion 12b. Note that the ring member 12 is an example of a "first turning member" of the present invention and that the disk member 11 is an example of a "second turning member" of the present invention. In addition, the boss portions 11a are an example of "protrusion portions" of the present invention.

As shown in FIGS. 3 and 4, the housing member 13 is in a cylindrical shape and has a housing portion 13a inside it for housing motor 15 and the like. The inner edge and the outer edge of the housing member 13 are provided with standing walls 13b and 13c, respectively. The inner standing wall 13b and the outer standing wall 13c form a circular recess 13d into which the ring member 12 is attached. A motor 15 that is a driving source for turning the ring member 12 is fixed to the housing portion 13a of the housing member 13. A worm gear 16 is attached to the rotation shaft of the motor 15 so that the driving force of the motor 15 can be transmitted to a gear 17 that will be described later. Wiring portions 15a (see FIG. 4) for supplying electric power to the motor 15 are connected electrically to one end portion of the motor 15.

In the housing portion 13a of the housing member 13, there are disposed three gears 17, 18, and 19 in a rotatable manner for transmitting the driving force of the motor 15 at a predetermined force by reducing the rotation speed of the motor 15. The gear 17 includes a major diameter gear 17a and a minor diameter gear 17b, which are formed integrally. The gear 18 includes a major diameter gear 18a and a minor diameter gear 18b, which are formed integrally. The major diameter gear 17a of the gear 17 engages with the worm gear 16, and the minor diameter gear 17b of the gear 17 engages with the major diameter gear 18a of the gear 18. The minor diameter gear 18b of the gear 18 engages with the gear 19. The gear 19 is arranged so that a part of it protrudes through a slit of the inner standing wall 13b of the housing member 13 toward the recess 13d of the housing member 13. The housing portion 13a is provided with screw fastening portions 20 for fastening the lid body 14 with screws 21 (see FIG. 2). Note that the motor 15 is an example of the "driving source" in the present invention.

The recess 13d of the housing member 13 is designed so that the ring member 12 can be placed in it in a rotatable manner as shown in FIG. 4. The gear 12a of the ring member 12 is designed so as to engage with the gear 19 protruding toward the recess 13d when the ring member 12 is placed in the recess 13d of the housing member 13. Thus, the driving force of the motor 15 is transmitted to the ring member 12 via the worm gear 16 and the gears 17-19, so that the ring member 12 turns. Note that the motor 15, the worm gear 16, and the gears 17-19 constitute the turning mechanism portion.

As shown in FIGS. 2 and 3, the lid body 14 has a function of preventing dusts from entering the housing portion 13a when it is attached to the housing member 13 so as to cover the upper portion of the housing portion 13a. The top surface of the lid body 14 is provided with step portions 14a each of which has a hole portion (not shown) on its bottom so that the lid body 14 can be fastened with screws 21 to the housing member 13. The top surface of the lid body 14 is provided with a notch hole 14b in a predetermined region for drawing out the wiring portions 15a of the motor 15 from the housing portion 13a.

Figure 9:
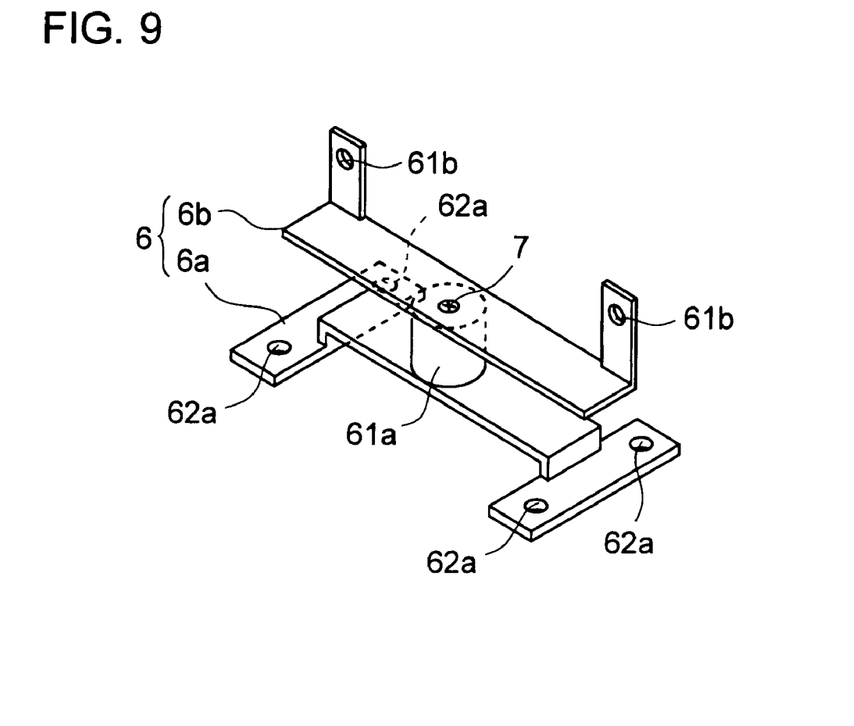
FIG. 9 is a general perspective view of a connection member that connects the swivel device according to the embodiment of the present invention shown in FIG. 1 and a main body of the video display apparatus.

As shown in FIG. 9, the connection member 6 is made up of a first connection member 6a that is attached to the disk member 11 and a second connection member 6b that is attached to the video display apparatus main body portion 1. The second connection member 6b is adapted to be fixed to a support pillar portion 61a of the first connection member 6a with a screw 7. The first connection member 6a has four threaded holes 62a for fixing the first connection member 6a to the disk member 11, and the second connection member 6b has threaded holes 61b so that it can be fixed to the video display apparatus main body portion 1 with screws (not shown).

The base member 5 has a function of fixing the housing member 13 as shown in FIGS. 1-3. The cover member 4 has a function of covering the swivel device 10 as shown in FIG. 1 so that the swivel device 10 cannot be seen externally.

Figure 10:
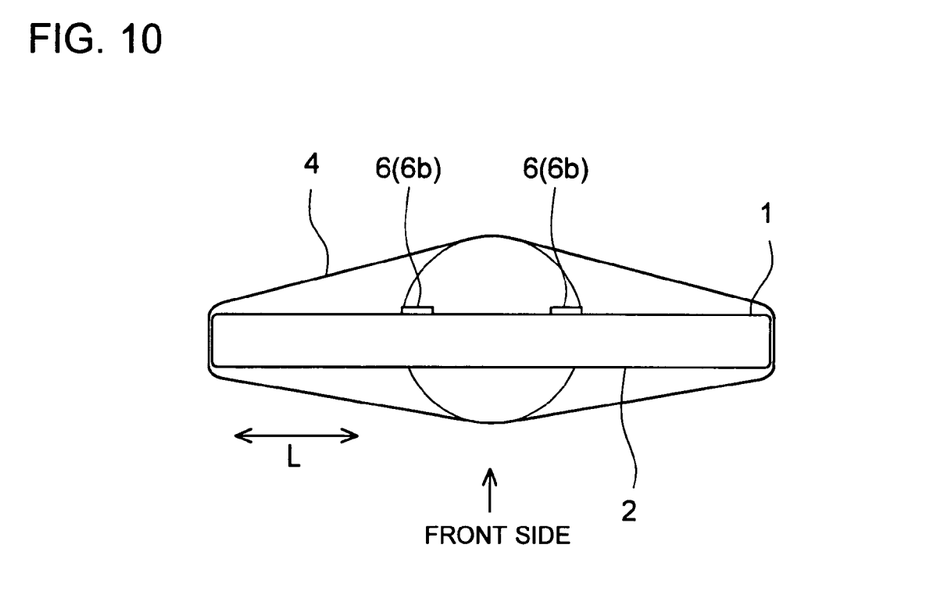
FIG. 10 is a plan view for explaining a swivel operation of the video display apparatus equipped with the swivel device according to the embodiment of the present invention shown in FIG. 1.
Figure 11:
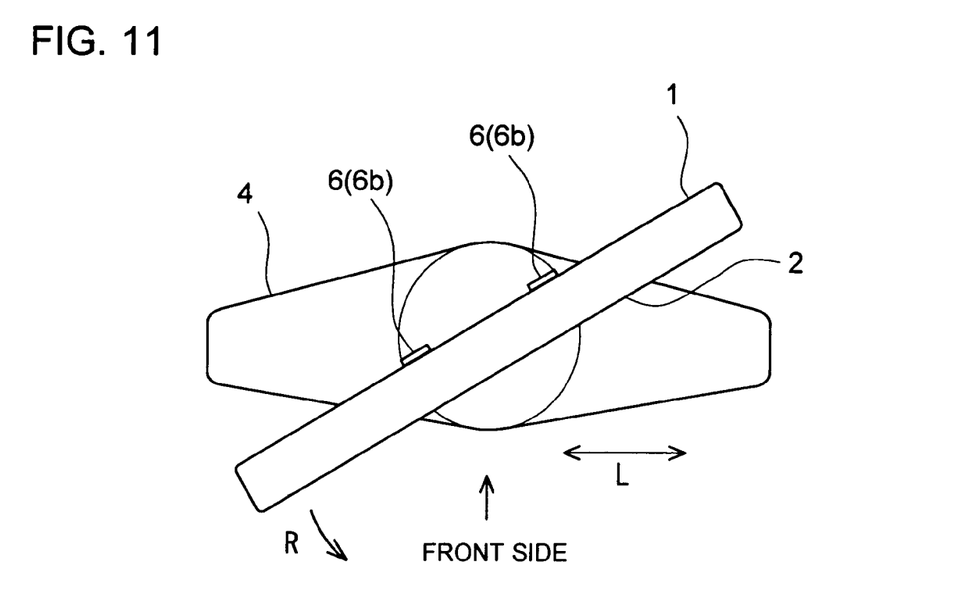
FIG. 11 is a plan view for explaining a swivel operation of the video display apparatus equipped with the swivel device according to the embodiment of the present invention shown in FIG. 1.

FIGS. 10 and 11 are plan views for explaining a swivel operation of the video display apparatus equipped with the swivel device according to the embodiment of the present invention shown in FIG. 1. Next, with reference to FIGS. 4, 7, 10, and 11, a swivel operation of the video display apparatus equipped with the swivel device 10 according to the present embodiment will be described.

First, in an initial state, the video display apparatus main body portion 1 is positioned in parallel with the direction in which the cover member 4 extends (the direction of an arrow L) as shown in FIG. 10 (in the state where the video display portion 2 faces the front side). When the motor 15 is driven from this state, the worm gear 16 turns so that the driving force of the motor 15 is transmitted to the gear 17, and the gear 17 turns in the direction of an arrow A1 as shown in FIG. 4. Thus, the gear 18 turns in the direction of an arrow B1, and the gear 19 turns in the direction of the arrow C1. The rotation of the gear 19 in the direction of an arrow C1 makes the ring member 12 rotate in the direction of an arrow D1.

When the ring member 12 turns in the direction of the arrow D1, the disk member 11 also turns in the direction of the arrow D1 because of the friction resistance between the groove portion 12b of the ring member 12 and the boss portions 11a of the disk member 11. When the disk member 11 turns in the direction of the arrow D1, the connection member 6 (see FIG. 1) that is fixed to the disk member 11 turns around the vertical axis. Then, the video display apparatus main body portion 1 turns in the direction of an arrow R as shown in FIG. 11. Thus, the direction of the video display portion 2 of the video display apparatus main body portion 1 can be changed in the right direction by the driving force of the motor 15.

Figure 7:
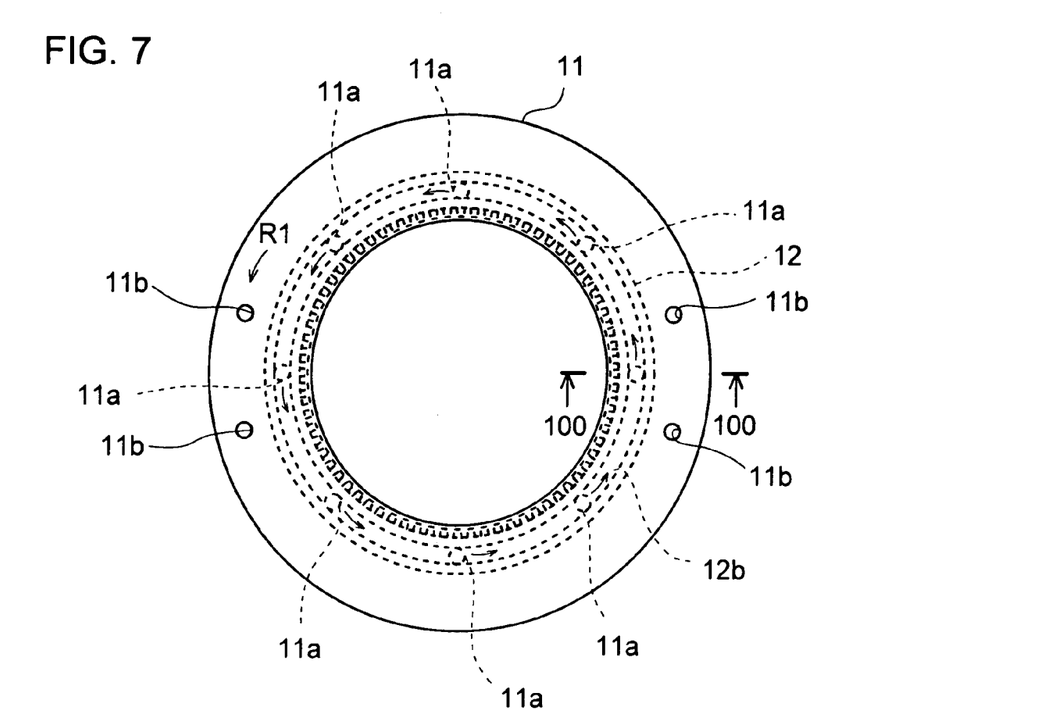
FIG. 7 is a plan view showing the swivel device according to the embodiment of the present invention shown in FIG. 1 in the state where boss portions of the disk member are inserted in a groove portion of the ring member.
Figure 8:
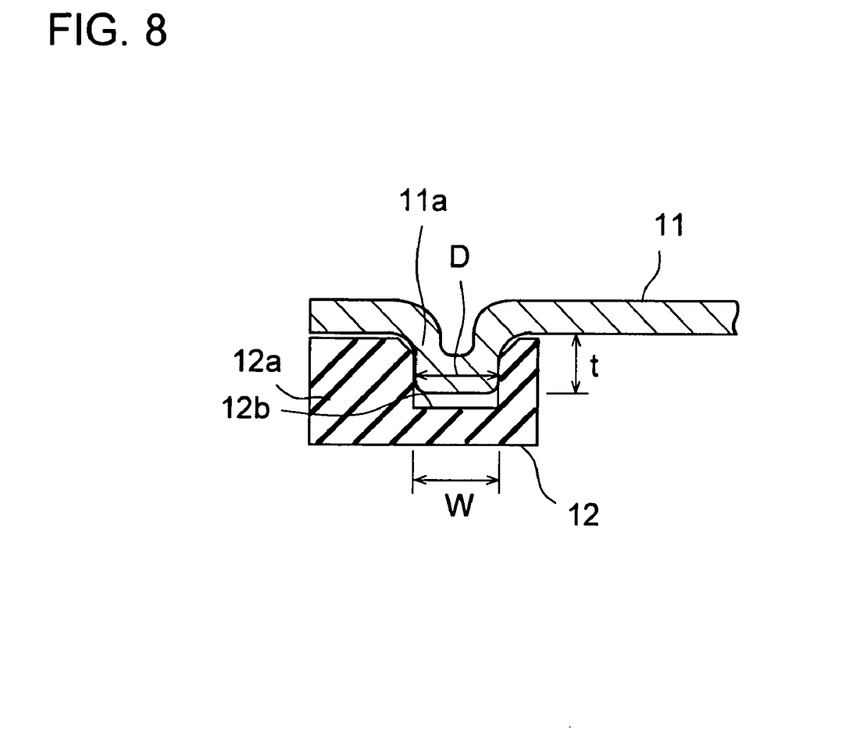
FIG. 8 is a cross section cut along the line 100-100 in FIG. 7.

On the other hand, when the video display apparatus main body portion 1 is turned by the manual operation in the direction of the arrow R in FIG. 11, a force is exerted via the connection member 6 to the disk member 11 in the direction of the arrow R1 in FIG. 7. In this case, since movements of the gears 17-19 are restricted by the worm gear 16 as shown in FIG. 4 and a large rotation resistance is exerted on the ring member 12, the boss portions 11a of the disk member 11 slip in the arrow direction (the same direction as the R1 direction) with respect to the groove portion 12b of the ring member 12 as shown in FIG. 7. Thus, the video display apparatus main body portion 1 can be turned by the manual operation in the direction of the arrow R in FIG. 11, and the direction of the video display portion 2 of the video display apparatus main body portion 1 can be changed toward the right side.

Note that the operation opposite to the above-mentioned case should be performed in the case where the video display apparatus main body portion 1 is turned in the direction opposite to the above-mentioned case (in the left direction). In addition, if the video display apparatus main body portion 1 is turned in the direction opposite to the above-mentioned case (in the left direction) by the manual operation, the boss portions 11a of the disk member 11 slip with respect to the groove portion 12b of the ring member 12 in the direction opposite to the above-mentioned case. Thus, the video display apparatus main body portion 1 can be turned in the left direction by the manual operation. In this way, the direction of the video display portion 2 of the video display apparatus main body portion 1 can be changed toward the left side.

In the present embodiment, as described above, the disk member 11 is provided with the boss portions 11a while the ring member 12 is provided with the groove portion 12b into which the boss portions 11a are inserted in a slidable manner in the swivel direction. Therefore, if a force larger than a predetermined force is exerted on the boss portions 11a in the swivel direction in the state where the boss portions 11a are inserted in the groove portion 12b, the boss portions 11a can slip in the swivel direction. Therefore, even if the worm gear 16a generates a swivel resistance on the ring member 12, the disk member 11 can be turned in the swivel direction. Thus, when the video display apparatus main body portion 1 is attached to the disk member 11, the video display apparatus main body portion 1 can be turned by the manual operation so that the direction of the video display portion 2 of the video display apparatus main body portion 1 can be changed by the manual operation.

In the present embodiment, since the boss portions 11a are provided integrally to the disk member 11 while the groove portion 12b is provided integrally to the ring member 12, an increase in the number of components can be suppressed even if the boss portions 11a and the groove portion 12b are provided.

In addition, the groove portion 12b is provided to the ring member 12 in a circular pattern and the eight boss portions 11a are provided to the disk member 11 with equal spaces in the swivel direction in the present embodiment. Therefore, when the eight boss portions 11a disposed with equal spaces in the swivel direction are inserted in the groove portion 12b of the ring member 12, displacement of the disk member 11 can be suppressed at the eight positions of the disk member 11. Therefore, compared with the case where positioning of the disk member 11 with respect to the ring member 12 is performed at one position, the disk member 11 can be attached to the ring member 12 more accurately. In addition, even if the disk member 11 turns with respect to the ring member 12, displacement of the disk member 11 in the radial direction can be suppressed effectively.

In addition, since the boss portions 11a are formed by deforming predetermined regions of the disk member 11 made of a metal sheet in the present embodiment, the boss portions 11a can be provided integrally with the disk member 11 in an easy manner.

In addition, since the boss portion 11a is formed in a cylindrical shape so that the boss portion 11a can make a line contact with the groove portion 12b in the present embodiment, contact area between the boss portion 11a and the groove portion 12b can be reduced. Therefore, friction resistance between the boss portion 11a and the groove portion 12b can be reduced, so that the video display apparatus main body portion 1 can be turned smoothly by the manual operation.

Note that the embodiments described above are merely examples in every respect and should not be interpreted as limiting the present invention. The scope of the present invention is defined not by the above description of the embodiments but by the appended claims, which should be interpreted to include every equivalent and modification.

For example, although the embodiment described above shows a structure in which the boss portions are provided integrally with the disk member and the groove portion into which the boss portions are inserted is provided integrally with the ring member, the present invention is not limited to this structure. It is possible to adopt another structure in which the boss portions are provided to the ring member integrally while the groove portion into which the boss portions are inserted is provided to the disk member integrally.

The embodiment described above shows an example in which the disk member to which the connection member is attached is made by processing a metal sheet, but the present invention is not limited to this example. It is possible to make the disk member by processing a material other than the metal sheet.

In addition, although the embodiment described above shows an example in which the boss portions are formed integrally with the disk member by the press work (extruding) of the disk member made of a metal sheet, the present invention is not limited to this example. It is possible to form the boss portions integrally by a method other than the press work.

Furthermore, although the embodiment described above shows an example in which the boss portion is formed in a cylindrical shape, the present invention is not limited to this example. The shape of the boss portion may be a shape other than the cylindrical shape. For example, it is possible to form the boss portion in a circular arc shape.

In addition, although the embodiment described above shows an example in which the disk member is provided with eight boss portions, the present invention is not limited to this example. The number of the boss portions may be other than eight. For example, it is possible to provide one boss portion to the disk member.

In addition, although the embodiment described above shows an example in which the eight boss portions are disposed with equal spaces from each other in the swivel direction (symmetrically), the present invention is not limited to this example. It is sufficient if they are disposed in the swivel direction with predetermined spaces. In other words, the spaces between neighboring boss portions may not the same space.

Although the embodiment described above shows an example in which the motor is used as the driving source, the present invention is not limited to this example. It is possible to use a driving source other than a motor.

In addition, although the embodiment described above shows an example in which the gears are used for transmitting the driving force of the motor, the present invention is not limited to this example. Instead of the gears, it is possible to use pulleys and a belt, sprockets and a chain, or a combination of these and gears.

In addition, although the embodiment described above shows an example in which the liquid crystal television set is attached to the swivel device so that it can turn, the present invention is not limited to this example. A video display apparatus other than the liquid crystal television set may be attached to the swivel device. For example, a video display apparatus such as a plasma television set may be attached to the swivel device.

What is claimed is:

1. A swivel device comprising:
a turning mechanism portion that includes a driving source and transmits a driving force;
a housing member that houses the turning mechanism portion;
a first turning member that engages with the turning mechanism portion and is capable of being turned by the driving force;
a second turning member to which the driving force is transmitted via the first turning member, the second turning member being made of a metal sheet;
a plurality of protrusion portions each having a cylindrical shape and provided integrally with the second turning member by deforming a predetermined region thereof, the plurality of protrusion portions being arranged with predetermined spaces in a swivel direction;
a groove portion that is provided integrally with the first turning member in a circular pattern and into which the plurality of protrusion portions of the second turning member are inserted in a manner slidable in the swivel direction,
wherein a cross sectional diameter of the protrusion portions having a cylindrical shape is slightly larger than a groove width of the groove portion and the protrusion portions are inserted into the groove portion so that a predetermined friction resistance is caused by friction between the protrusion portions and the groove portion.

2. A video display apparatus equipped with the swivel device according to claim 1.

* * * * *